(12) United States Patent
Freitas et al.

(10) Patent No.: US 10,094,489 B2
(45) Date of Patent: Oct. 9, 2018

(54) AXIAL RESISTANCE VALVE TRIM DESIGN

(71) Applicant: Control Components, Inc., Rancho Santa Margarita, CA (US)

(72) Inventors: Stephen G. Freitas, Rancho Santa Margarita, CA (US); Raymond R. Newton, Rancho Santa Margarita, CA (US); Daniel Allen Lee Watson, Rancho Santa Margarita, CA (US); Timo Kubota, Rancho Santa Margarita, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 129 days.

(21) Appl. No.: 15/013,604

(22) Filed: Feb. 2, 2016

(65) Prior Publication Data

US 2016/0223099 A1    Aug. 4, 2016

Related U.S. Application Data (60) Provisional application No. 62/111,584, filed on Feb. 3, 2015.

(51) Int. Cl.
*F16K 47/04* (2006.01)
*F16K 47/08* (2006.01)
*F16L 55/02* (2006.01)

(52) U.S. Cl.
CPC .............. *F16K 47/08* (2013.01); *F16K 47/04* (2013.01); *F16L 55/02* (2013.01); *Y10T 137/86791* (2015.04)

(58) Field of Classification Search
CPC .......... F16L 55/02; F16K 47/04; F16K 47/08; Y10T 137/86791
See application file for complete search history.

(56) References Cited

U.S. PATENT DOCUMENTS

| | | | | |
|---|---|---|---|---|
| 3,451,404 A * | 6/1969 | Self | ........................... | F15D 1/14 137/14 |
| 3,791,413 A * | 2/1974 | Muller | .................... | F16K 47/04 137/625.3 |
| 3,894,716 A * | 7/1975 | Barb | ....................... | F16K 47/02 137/625.3 |
| 3,971,411 A * | 7/1976 | Baumann | .................. | F16K 1/54 137/625.3 |
| 3,990,475 A * | 11/1976 | Myers | ....................... | F16K 3/34 137/625.3 |
| 4,024,891 A * | 5/1977 | Engel | ..................... | F16K 47/04 137/625.3 |

(Continued)

FOREIGN PATENT DOCUMENTS

EP              167252 A1     1/1986

OTHER PUBLICATIONS

ISR and Written Opinion for PCT/US2016/016445, dated Apr. 14, 2016.

*Primary Examiner* — Matthew W Jellett
*Assistant Examiner* — Christopher Ballman
(74) *Attorney, Agent, or Firm* — Stetina Brunda Garred and Brucker; Mark B. Garred (57) ABSTRACT

A control valve which includes a discrete, multi-stage, multi-path valve trim, located in concentric cylinders, along the outlet axis of the valve, with potential to characterize flow resistance at different opening points.

22 Claims, 9 Drawing Sheets

(56) References Cited

U.S. PATENT DOCUMENTS

| | | | | |
|---|---|---|---|---|
| 4,068,683 A * | 1/1978 | Self | F16K 47/08 |
| | | | 137/625.3 |
| 4,249,574 A * | 2/1981 | Schnall | F15C 1/02 |
| | | | 137/625.3 |
| 4,398,563 A * | 8/1983 | Kay | F16K 3/34 |
| | | | 137/625.3 |
| 4,567,915 A * | 2/1986 | Bates | F16K 47/08 |
| | | | 137/625.3 |
| 4,921,014 A * | 5/1990 | Tartaglia | F16K 47/08 |
| | | | 137/494 |
| 4,923,166 A * | 5/1990 | Raftis | F16K 7/06 |
| | | | 251/127 |
| 5,803,119 A | 9/1998 | Steinke | |
| 6,505,646 B1 * | 1/2003 | Singleton | F16K 47/08 |
| | | | 137/625.3 |
| 6,701,957 B2 | 3/2004 | McCarty et al. | |
| 7,013,919 B2 * | 3/2006 | Beth | F16K 47/08 |
| | | | 137/625.33 |
| 9,556,970 B2 * | 1/2017 | Mastrovito | F16K 47/08 |
| 9,624,748 B2 * | 4/2017 | Gnanavelu | E21B 33/076 |
| 2004/0050433 A1 * | 3/2004 | Nawaz | F16K 47/04 |
| | | | 137/625.39 |
| 2005/0199298 A1 * | 9/2005 | Farrington | F16K 47/08 |
| | | | 137/625.37 |
| 2009/0026395 A1 * | 1/2009 | Perrault | F16K 47/08 |
| | | | 251/127 |
| 2009/0183790 A1 * | 7/2009 | Moore | B22F 3/1055 |
| | | | 137/597 |
| 2010/0288389 A1 * | 11/2010 | Hopper | E21B 34/02 |
| | | | 138/43 |
| 2013/0193360 A1 | 8/2013 | Zhou et al. | |
| 2013/0276924 A1 | 10/2013 | Venkitasubramony et al. | |
| 2014/0124055 A1 | 5/2014 | Fontaine et al. | |
| 2014/0339454 A1 | 11/2014 | Doran | |
| 2016/0186869 A1 * | 6/2016 | Hopper | E21B 34/02 |
| | | | 251/121 |
| 2016/0186892 A1 * | 6/2016 | Hopper | F16K 25/04 |
| | | | 251/118 |
| 2016/0341335 A1 * | 11/2016 | Adams | F16K 47/08 |

* cited by examiner

AXIAL RESISTANCE VALVE TRIM DESIGN

CROSS-REFERENCE TO RELATED APPLICATIONS

The present application claims priority to U.S. Provisional Patent Application Ser. No. 62/111,584 entitled AXIAL RESISTANCE VALVE TRIM DESIGN filed Feb. 3, 2015.

STATEMENT RE: FEDERALLY SPONSORED RESEARCH/DEVELOPMENT

Not Applicable

BACKGROUND

1. Technical Field

The present disclosure relates generally to flow control devices and, more particularly, to a control valve which includes a discrete, multi-stage, multi-path valve trim, located in concentric cylinders, along the outlet axis of the valve, with potential to characterize flow resistance at different opening points.

2. Description of the Related Art

There is currently known in the prior art a type of control valve commonly referred to as a pintle valve wherein the short extension of a needle-valve tip is used to facilitate the control of fluid through the valve. An exemplary pintle-type fluid flow control device or control valve is described with particularity in Applicant's U.S. Pat. No. 5,803,119 entitled FLUID FLOW CONTROL DEVICE issued Sep. 8, 1998, the disclosure of which is incorporated herein by reference.

In a first embodiment of the control valve described in the '119 Patent, a cylindrical plug is moveable axially within a complimentary cylinder. The plug includes a fluid flow path extending axially therein. As the plug is moved axially relative to the cylinder, the area of path entry available for fluid flow and the length of the fluid flow path is varied. As a result, as the plug moves further out of the cylinder, a corresponding increase in fluid flow is obtained in the control valve. In a second embodiment, the plug is devoid of the aforementioned flow path, and is reciprocally movable within the bore of a tapered, annular sleeve. The sleeve is fitted into an external, solid cylinder. The outer surface of the sleeve is provided with a series of axially extending passageways, each of which fluidly communicates with the bore of the sleeve via a plurality of axially spaced and radially directed openings extending through the thickness of the sleeve. As the plug is lifted, successive openings along each passageway are exposed so that flow increases through the sleeve.

The flow control device or control valve constructed in accordance with the present invention represents an improvement over the control valve described in the '119 Patent, and in particular the second embodiment thereof, by virtue of its inclusion of more intricate and complex flow passages which each have a single entry and exit path. The increased intricacy/complexity of the flow passages within the control valve of the present invention provides for a better flow range/rangeability therethrough. These, as well as other features and advantages of the present invention, will be described in more detail below.

BRIEF SUMMARY

In accordance with the present disclosure, there is provided a control valve having a multi-stage, multi-path trim installed therein. Traditional multi-stage, multi-path valves use a series of concentric cages or stacked disks flow elements to control the flow of fluid inside the valve. The cages or stacked disks contain flow paths that are arranged perpendicular to the valve axis. In the control valve of the present invention, the flow paths are arranged parallel to the valve axis. The present control valve includes an external sleeve valve plug which throttles a flow control element comprising an annular, generally cylindrical cage which is disposed within an outer liner or seat ring. The cage defines a first or upper portion which, in one embodiment, is of a reduced diameter in comparison to a second or lower portion thereof. Fluid enters the upper portion of the cage perpendicular to the axis of the valve, and then turns to flow along the axis of the valve, the fluid traveling within feed slots formed within the upper portion of the cage. Each feed slot defines a portion of a corresponding one of the flow paths, and typically has a generally linear, non-tortuous configuration. Additionally, each of the feed slots has a dedicated, single entry or feed opening, each feed opening in the upper portion of the cage thus being connected to a discrete flow path. It is thus the feed openings in the upper portion of the cage that are throttled by the sleeve plug of the valve.

In the control valve, each of the feed slots transitions into a corresponding resistance path formed within the lower portion of the cage. As such, each flow path thus comprises the combination of a feed slot, and its corresponding resistance path. Each resistance path has a tortuous configuration, and a dedicated, single exit or outlet opening, thus resulting in each flow path having one fluid entry or inlet point, and one fluid exit or outlet point. Each flow path also features multiple stages of pressure reduction as facilitated by the resistance path thereof as formed in the outside of the lower portion of the cage. The resistance path of each flow path may also feature changes in depth or width which provide for expansion of the flow as it moves toward the corresponding outlet opening. The flow paths discharge into the bore of the cage and out of the valve. The aforementioned outer liner encapsulates the flow paths and isolates the fluid from the valve body.

The design of the present control valve permits considerable flexibility in the arrangement of the flow paths. The flow paths in this design can be arranged with different types of flow paths to vary the fluid resistance at different opening points. High resistance flow paths may be used near the valve seat, and low resistance or even open-hole ports can be used when the valve is full open. Open-hole ports can also be applied on top of the flow control element to provide a bypass flow path in case the axial flow paths become blocked with particulate.

Another feature of the design is that the ligament between stages in each flow path can be varied to provide resistance to erosion by extending the length of the flow control element. In conventional multi-stage cage or stacked disk designs, this is only possible by increasing the diameter of the flow control element. Increasing the diameter increases weight by the square of the difference, whereas increases in length increase weight linearly.

An additional feature of the design is that it can be used with an upstream seat, also known as external sleeve trim. In conventional multi-stage cage or stacked disk designs the valve plug is installed inside the flow control element. In flow-to-close applications, the fluid exiting the flow control element discharges on the valve plug, causing premature erosion. The arrangement of the valve trim of the present invention is better suited to external sleeve trim designs than conventional multi-stage cage or stacked disk designs.

Still further, the control valve of the present disclosure provides superior erosion resistance compared to traditional single-stage or even multi-stage designs. The number of pressure reduction stages can be significantly higher than in traditional designs, which reduces fluid velocities which cause erosion. The width of the ligaments inside the flow paths can be significantly greater, which provides longer life in erosive services. The design can be used with an upstream seat/external sleeve trim, which relocates the plug out of areas of high velocity.

The present disclosure is best understood by reference to the following detailed description when read in conjunction with the accompanying drawings.

BRIEF DESCRIPTION OF THE DRAWINGS

These, as well as other features of the present disclosure, will become more apparent upon reference to the drawings wherein.

Common reference numerals are used throughout the drawings and detailed description to indicate like elements.

DETAILED DESCRIPTION

Figure 1:
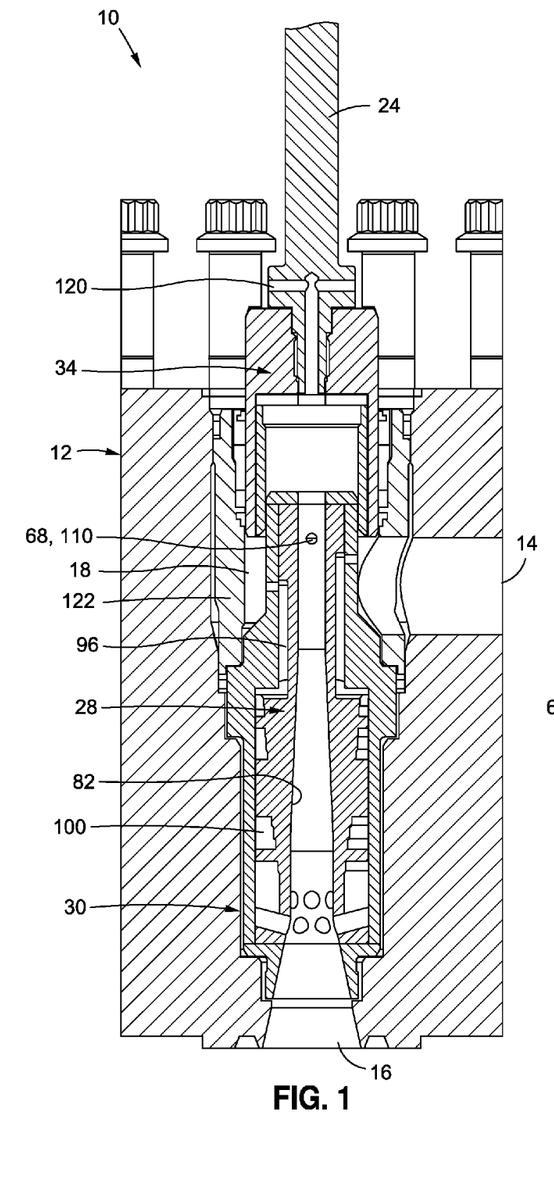
FIG. 1 is a partial cross-sectional view of a control valve constructed in accordance with a first embodiment of the present disclosure, illustrating the sleeve plug thereof in an open position.
Figure 2:
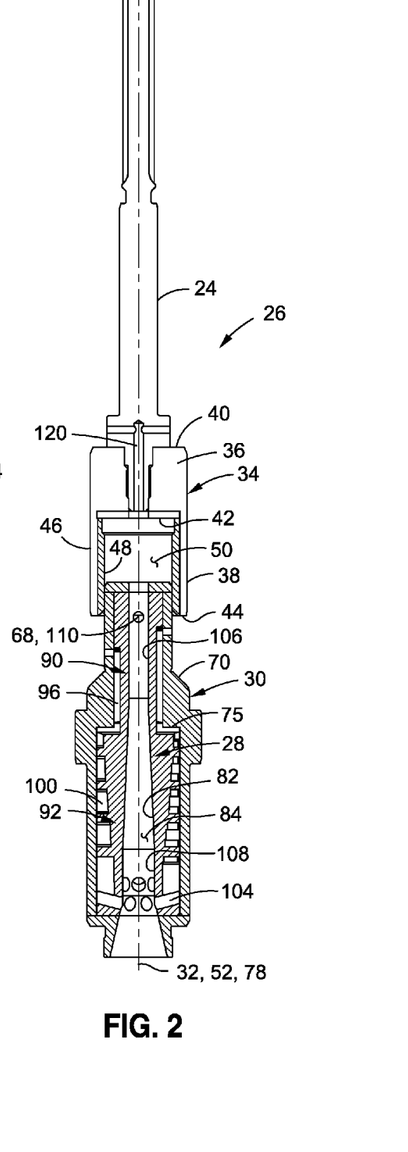
FIG. 2 is a cross-sectional view similar to FIG. 1, but depicting only the sleeve plug and flow control element of the valve, with the sleeve plug being in the open position.

Referring now to the drawings wherein the showings are for purposes of illustrating preferred embodiments only, and not for purposes of limiting the same, FIGS. 1-4 are cross-sectional views of a control valve 10 constructed in accordance with the present disclosure. As will be described in more detail below, the valve 10 is shown in FIGS. 1 and 2 in an open position, and in FIGS. 3 and 4 in a closed or shut-off position.

Figure 3:
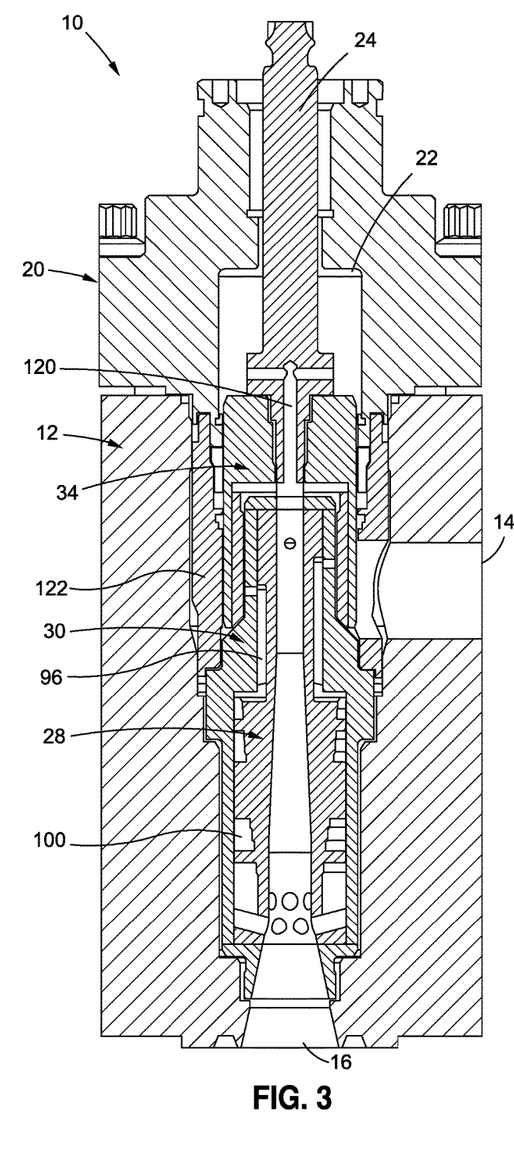
FIG. 3 is a partial cross-sectional view of the control valve constructed in accordance with the first embodiment of the present disclosure, illustrating the sleeve plug thereof in a closed position.

The control valve 10 includes a valve body 12 which defines an inflow passage 14 and an outflow passage 16. The inflow and outflow passages 14, 16 each fluidly communicate with an interior chamber or a valve gallery 18 partially defined by the body 12. In addition to the body 12, the valve 10 includes a bonnet 20 which is attached to the body 12 and partially encloses the gallery 18. As seen in FIGS. 1 and 3, the attachment of the bonnet 20 to the body 12 is preferably facilitated through the use of mechanical fasteners comprising a nut and bolt combination, though other attachment methods are contemplated to be within the spirit and scope of the present disclosure. The bonnet 20 defines a bore 22 which extends axially therethrough and communicates with the gallery 18. The bore 22 is of variable diameter and, as viewed from the perspective shown in FIGS. 1 and 3, includes a narrow middle section interposed between wider upper and lower sections, the purpose of which will be described in more detail below. An actuating valve stem 24 extends into the bore 22 and is reciprocally moveable therein to selectively actuate the control valve 10.

Disposed within the gallery 18 of the body 12 is a flow control element 26 (see FIGS. 5-7) which provides flow resistance as fluid flows from the inflow passage 14 to the outflow passage 16. The flow control element 26 generally includes an annular, generally cylindrical cage 28 which is disposed within an outer sleeve or liner 30. The flow control element 26 includes a plurality of flow paths positioned between the inflow passage 14 and the outflow passage 16, wherein the flow paths are specifically configured and adapted to reduce the pressure of the fluid flowing therethrough from the inflow passage 14 toward the outflow passage 16. The flow paths are arranged substantially parallel to a valve axis 32 and in a multi-staged configuration, such that the flow paths are selectively throttled via an external sleeve valve plug or simply sleeve plug 34 which is transitional between an open position and a closed position as will be described in more detail below.

Figure 4:
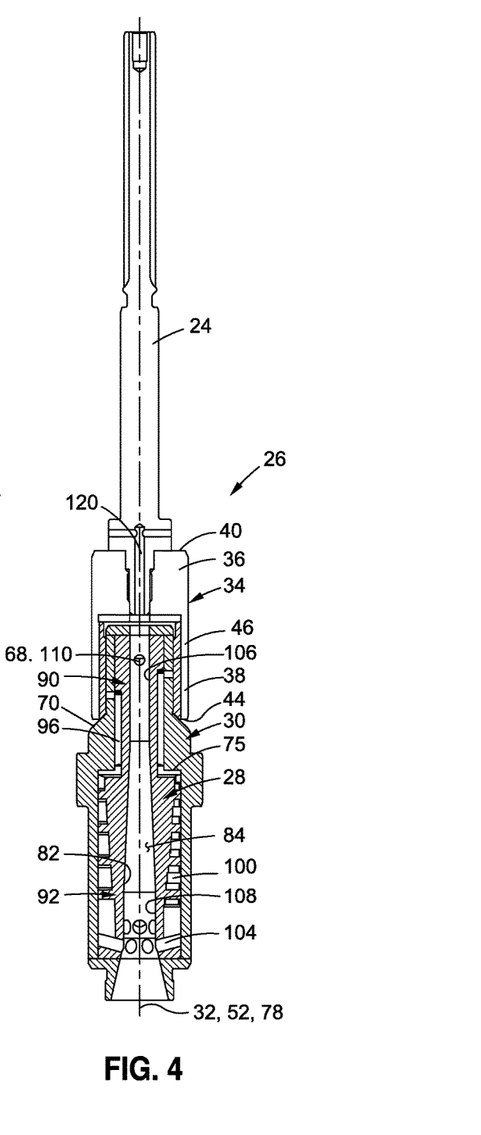
FIG. 4 is a cross-sectional view similar to FIG. 3, but depicting only the sleeve plug and flow control element of the valve, with the sleeve plug being in the closed position.

Referring first to FIGS. 1 and 2, the sleeve plug 34 is shown in the open position, which allows fluid to flow into the flow paths of the flow control element 26. The sleeve plug 34 may be selectively transitioned from the open position to the closed position, as depicted in FIGS. 3 and 4, to prevent fluid from entering the flow paths of the flow control element 26. The sleeve plug 34 is coupled to the valve stem 24 and includes stem attachment portion 36 and a throttling portion 38 extending from the stem attachment portion 36. The stem attachment portion 36 includes an outer end surface 40 and an inner end surface 42. The stem attachment portion 36 is attached to the valve stem 24 such that the valve stem 24 preferably does not extend beyond the inner end surface 42. The throttling portion 38 is an annular structure extending from the stem attachment portion 36 and terminating to define a distal rim 44. The throttling portion 38 further includes an annular outer surface 46 and an opposing annular inner surface 48. The inner end surface 42 of the stem attachment portion 36 and the annular inner surface 48 of the throttling portion 38 collectively define a sleeve recess 50 within which the flow control element 26 is received when the sleeve plug 34 is in the closed position.

Figure 5:
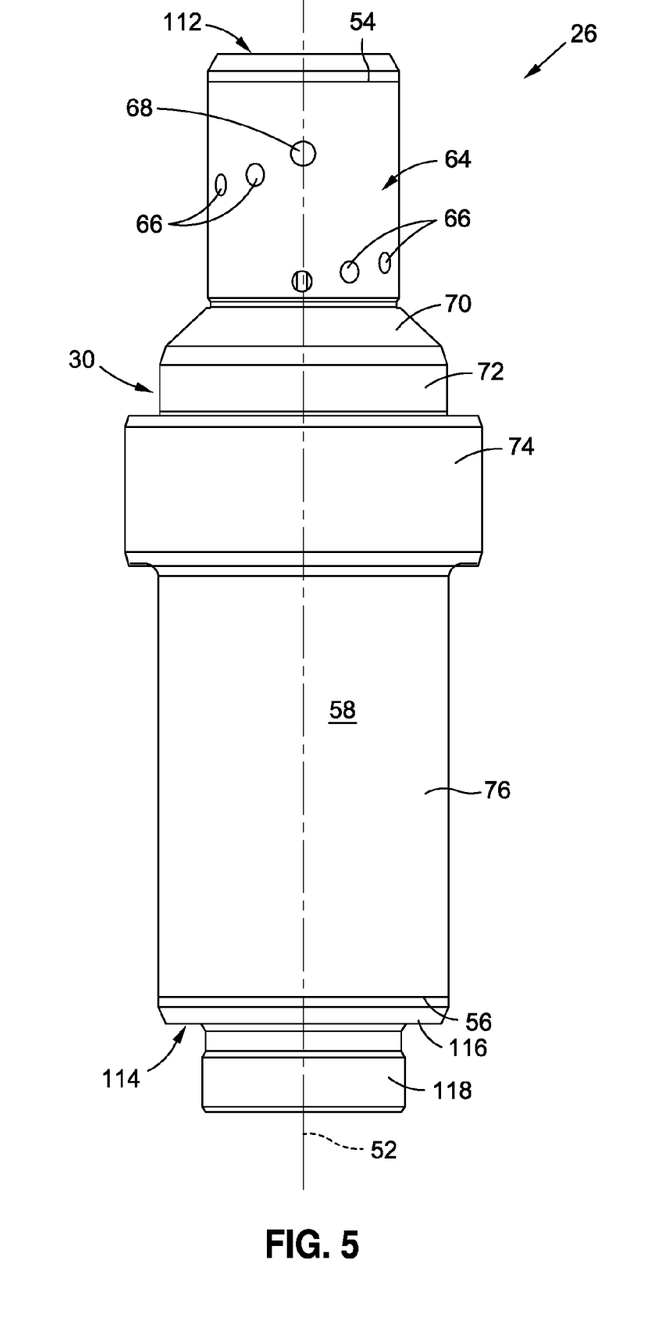
FIG. 5 is a side-elevational view the flow control element of the control valve shown in FIGS. 1-4.
Figure 6:
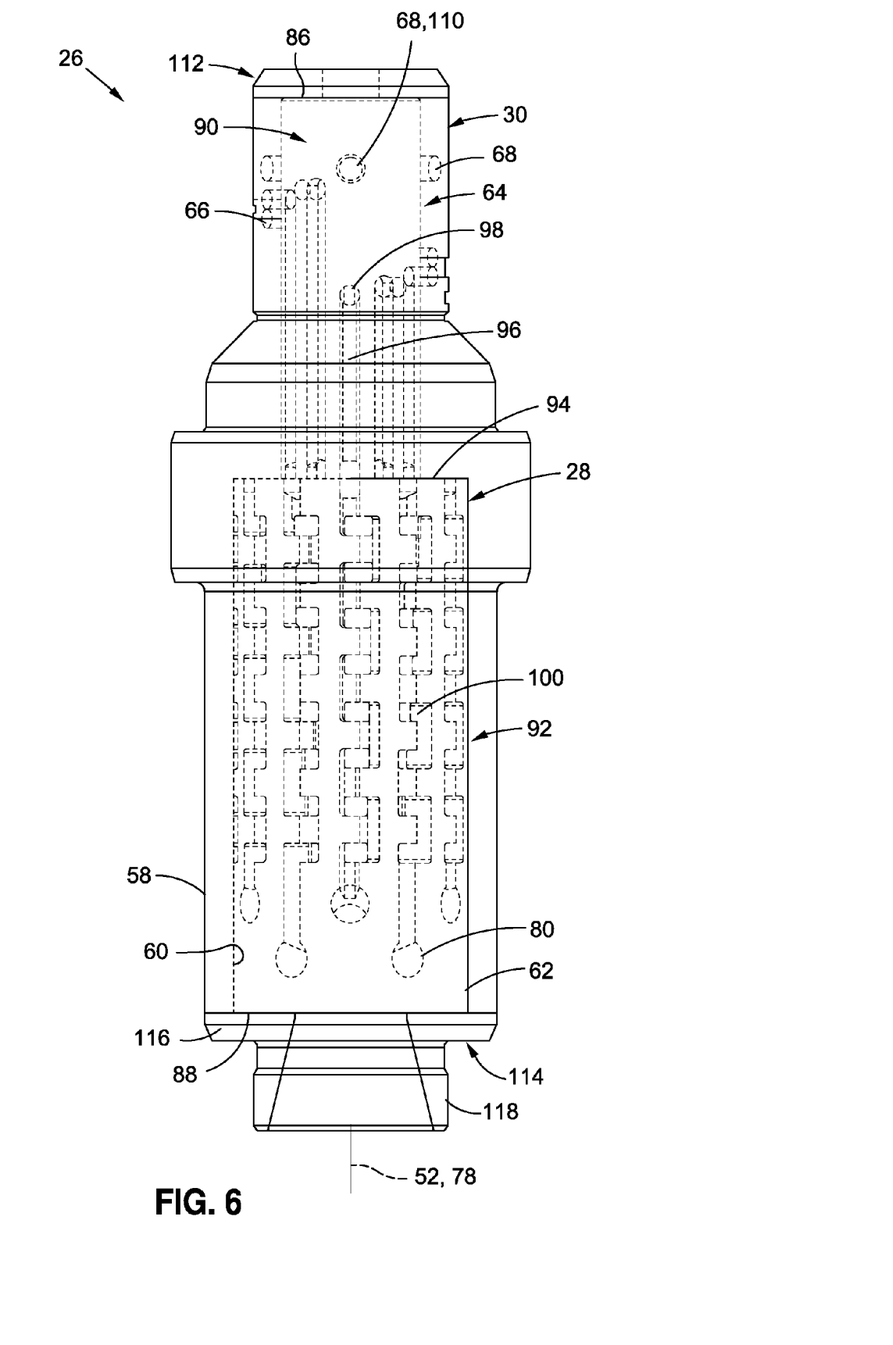
FIG. 6 is a side-elevational view of the flow control element shown in FIG. 5, the outer sleeve or liner of the flow control element being transparent to facilitate the depiction of the internal cage thereof.
Figure 7:
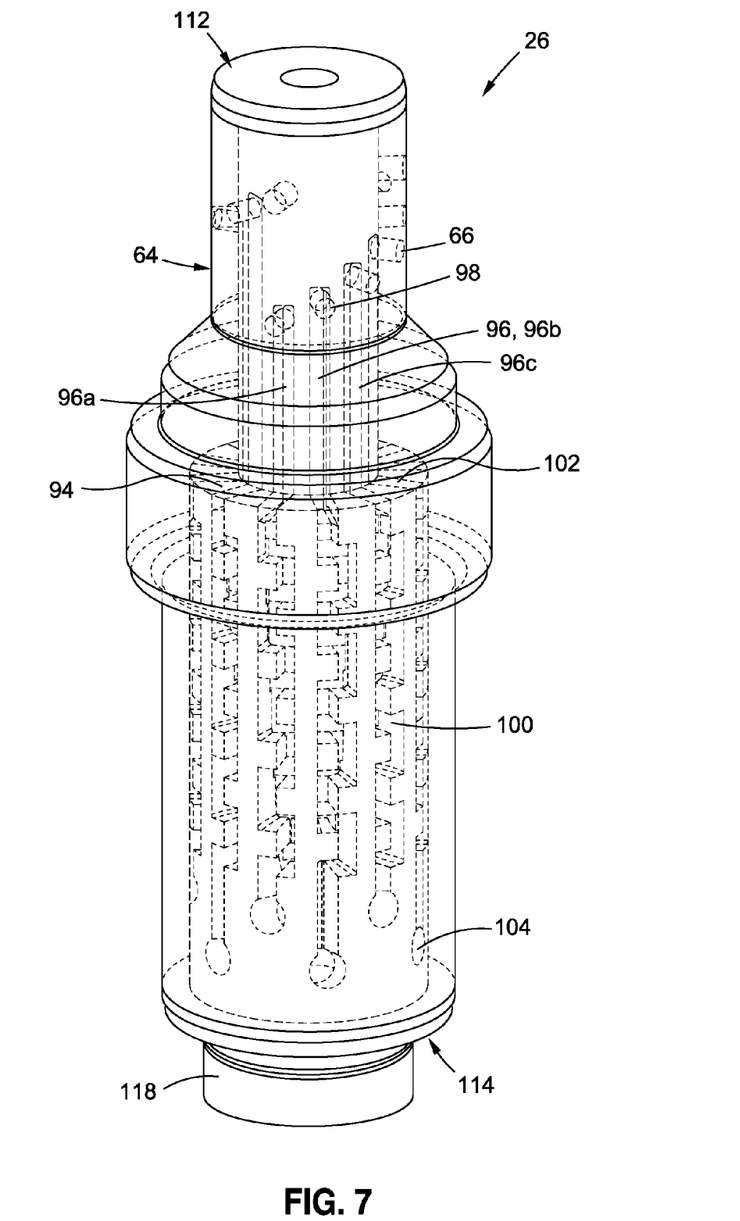
FIG. 7 is a perspective view of the flow control element shown in FIGS. 5 and 6, the outer sleeve or liner of the flow control element being transparent to facilitate the depiction of the internal cage thereof.
Figure 8:
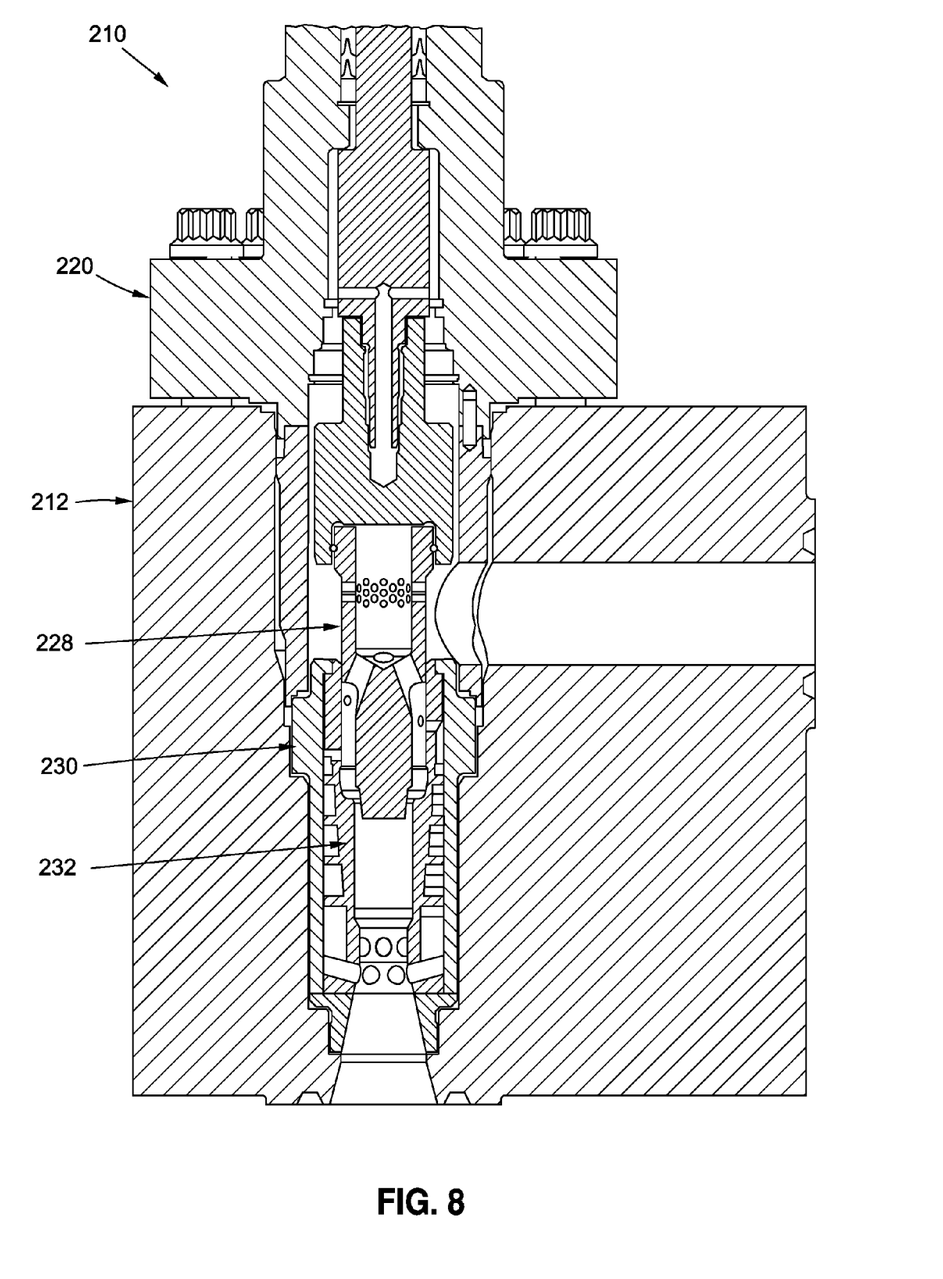
FIG. 8 is a partial cross-sectional view of a control valve constructed in accordance with a second embodiment of the present disclosure, illustrating the plug thereof in an open position.

Referring now to FIGS. 5-7, the flow control element 26 is depicted, with FIG. 5 providing a side elevational view of the flow control element 26, and FIGS. 6 and 7 showing the flow control element 26 with the outer liner 30 being transparent to facilitate the depiction of the inner cage 28. As will be described in more detail below, the outer liner 30 and cage 28 are formed separately and then joined while in a fuseable state to ultimately form the flow control element 26.

The outer liner 30 defines a liner axis 52 and includes a pair of opposing end walls 54, 56, as well as an outer surface 58 and an inner surface 60 defining a liner opening 62 extending along the liner axis 52. The liner opening 62 is substantially complimentary in shape to external configuration of the cage 28. The outer liner 30 includes an inlet section 64 having a plurality of inlet openings 66 extending between the outer and inner surfaces 58, 60 generally perpendicular to the liner axis 52. The plurality of inlet openings 66 are arranged at varying locations along the liner axis 52. In the exemplary embodiment, the inlet openings 66 are arranged in a helical configuration, with adjacent openings 66 being slightly offset from each other in an axial direction. It is contemplated that the inlet openings 66 may be arranged in a single-helix arrangement, double-helix arrangement, or other suitable arrangements as may be implemented based on the desired functionality of the control valve 10.

The outer surface 58 of the outer liner 30 at the inlet section 64 is of a substantially uniform diameter, which is smaller than the outer diameter of the remaining portions of the outer liner 30. The outer diameter of the inlet section 64 is also slightly smaller than the inner diameter of the throttling portion 38 of sleeve plug 34 to allow the inlet section 64 to be received within the sleeve recess 50 when the plug 34 is in the closed position.

The outer liner 30 may include one or more liner bypass openings 68 formed between the inlet openings 66 and the end wall 54, wherein the liner bypass openings 68 extend from the outer surface 58 to the inner surface 60. The purpose of the liner bypass openings 68 will be discussed in more detail below.

The inlet section 64 of the outer liner 30 transitions into a frusto-conical liner seating surface 70 specifically configured and adapted to interface with the sleeve plug 34 when the sleeve plug 34 is in the closed position. The liner seating surface 70 flares outwardly from the inlet section 64, with the diameter of the liner seating surface 70 increasing as the liner seating surface 70 extends away from the inlet section 64.

The liner seating surface 70 transitions into an extension section 72, which is of substantially uniform diameter and extends between the liner seating surface 70 and a flange 74, which defines a maximum outer diameter. The flange 74 transitions into an outlet section 76 which has an outer diameter smaller than that of the flange 74.

The inner surface 60 of the outer liner 30 is stepped and defines a first diameter, a second diameter, and a shoulder 75 (see FIGS. 2 and 4) therebetween. In an exemplary embodiment, the smaller first diameter extends from the end wall 54 to the flange 74, with the shoulder 75 being located in the flange 74. The larger second diameter extends from the shoulder 75 to the end wall 56.

The cage 28 defines a cage axis 78 and includes an outer surface 80 and an inner surface 82 which defines a cage bore 84 extending along the cage axis 78 between opposed end walls 86, 88 (see FIG. 6) of the cage 28. The cage 28 further defines a first or upper portion 90 which, in one embodiment, is of a reduced diameter in comparison to a second or lower portion 92 thereof. A cage shoulder 94 separates the first portion 90 from the second portion 92. A plurality of substantially linear feed slots 96 are formed in the first portion 90 of the cage 28, with each feed slot 96 extending into the cage 28 from the outer surface 80, and further extending in spaced, generally parallel relation to the cage axis 78. The feed slots 96 extend only partially between the outer surface 80 and the inner surface 82, and thus are not in direct fluid communication with the cage bore 84. Each feed slot 96 includes an inlet end portion 98 in alignment with and in communication with a corresponding inlet opening 66 formed on the outer liner 30 when the cage 28 is inserted within the outer liner 30. The inlet end portions 98 of the various feed slots 96 are preferably formed at different locations along the cage axis 78, which results in feed slots 96 having different lengths. The "length" of each feed slot 96 is defined as the distance between the cage shoulder 94 and the distal tip of the inlet end portion 98. Since the inlet end portions 98 are in communication with the helically arranged inlet openings 66, the lengths of the feed slots 96 are incrementally variable in a circumferential direction. For instance, looking at the cage depicted in FIG. 7, slot 96a is of a first length, adjacent slot 96b is of a second length greater than the first length, and slot 96c is of a third length greater than the second length, and so on. The feed slots 96 in the exemplary embodiment are of substantially similar width and are substantially evenly spaced around the circumference of the first portion 90 of the cage 28. However, it is understood that in other embodiments, the feed slots 96 may have variable widths and/or depths, and may further be unevenly spaced around the circumference of the first portion 90 of the cage 28 without departing from the spirit and scope of the present invention. Furthermore, it is also contemplated that other implementations of the cage 28 may include non-linear (e.g., tortuous) feed slots.

The second portion 92 of the cage 28 includes a plurality of tortuous resistance paths 100 in communication with respective ones of the plurality of feed slots 96 via a respective connecting slot 102 formed in the shoulder 94. Each resistance path 100 extends into the cage 28 from the outer surface 80 of the second portion 92 of the cage 28 along an axis perpendicular to the cage axis 78 to define a resistance path depth. The resistance paths 100 extend only partially into the cage 28, and thus, the resistance paths 100 are not in direct fluid communication with the cage bore 84. The resistance paths 100 are tortuous or serpentine in configuration, and thus include both axial and circumferential components. In particular, adjacent axial components are connected via an intervening circumferential component. The tortuous or serpentine configuration of the resistance paths 100 provides multiple stages of pressure reduction as fluid flows therethrough.

Each resistance path 100 is in fluid communication with a discharge opening 104, which extends radially through the cage 28 between the outer and inner surfaces 80, 82. As can be seen in FIGS. 1-4, the exemplary discharge openings 104 are angled downwardly, and thus are offset from an axis perpendicular to the cage axis 78. However, it is understood that the discharge openings 104 may be perpendicular to the cage axis 78 without departing from the spirit and scope of the present invention. The center of the discharge opening 104, as formed on the outer surface 80 of the cage 28, is spaced from the shoulder 94 by a discharge opening distance. In the exemplary embodiment, a first group of discharge openings 104 are formed at a first discharge opening distance and a second group of discharge openings 104 are formed at a second discharge opening distance. The discharge openings 104 are arranged around the circumference of the cage in an alternating pattern, i.e., a discharge opening 104 from the first group is positioned between a pair of discharge openings 104 from the second group.

As shown in FIGS. 1-4, the depth of the resistance path 100 increases from the shoulder 94 to the discharge opening 104. The increase in resistance path depth allows for a greater reduction in pressure as the fluid flows therethrough. The width of the resistance paths 100 may also vary to further enhance the pressure reducing capabilities of the control valve 10, and in particular the flow control element 26 thereof. Although the exemplary embodiment includes resistance paths 100 with a variable depth, it is understood that in other embodiments, the resistance paths may have a substantially uniform depth and/or width along the length thereof.

The inner surface 82 of the cage 28 includes a first section 106 that is of substantially uniform diameter, wherein the first section 106 transitions into a second section 108 that is of a gradually increasing diameter.

The cage 28 may additionally include one or more cage bypass openings 110 formed in the first upper portion 90 between the feed slots 96 and the end wall 86, with the bypass openings 110 extending between the outer and inner surfaces 80, 82 thereof. The cage bypass openings 110 are aligned with and in fluid communication with respective ones of the liner bypass openings 68 when the cage 28 is inserted within the outer liner 30. As will be described in more detail below, the bypass openings 110 are configured to allow fluid to enter the cage bore 84 without having to travel through the feed slots 96 and resistance paths 100, as may be the case in the event of blockage of the feed slots 96 or resistance paths 100.

The cage 28 and outer liner 30 may be formed separately and joined when each is in a semi-soft or workable state (e.g., a "green" state), which allows the newly formed assembly (i.e., the combined cage 28 and outer liner 30) to meld together to form a unitary structure. In particular, the first portion 90 of the cage 28 is inserted into the outlet section 76 of the outer liner 30, with the cage 28 being advanced into the liner 30 until the cage shoulder 94 rests against the liner shoulder 75. The cage 28 and outer liner 30 are preferably formed such that the corresponding end walls 54, 86 and 56, 88 and are substantially flush with each other when the cage 28 is completely inserted into the liner 30. The cage 28 is rotationally aligned with the liner 30 such that the inlet openings 66 are aligned with corresponding ones of the feed slot inlet end portions 98, and the liner bypass openings 68 are aligned with corresponding ones of the cage bypass openings 110. A first end cap 112 is placed over the inlet section 64 of the liner 30 and first portion 90 of the cage 28 and a second end cap 114 is placed over the outlet section 76 of the liner 30 and the second portion 92 of the cage 28. The first end cap 112 is annular in shape and includes an opening that is complimentary in size to the cage bore 84 at the end wall 86 of the cage 28. Likewise, the second end cap 114 includes an opening that preferably compliments the tapered cage bore 84 at end wall 88. The second end cap 114 may additionally a flange 116 which extends over the end wall 88, and a cylindrical section 118 extending axially from the flange 116.

When the cage 28 is completely inserted within the outer liner 30 and the first and second end caps 112, 114 are placed in their respective positions, the entire assembly may be heated as allows the components to fuse together and form a substantially rigid, uniform structure upon cooling of the assembly.

After the flow control element 26 is assembled, it may be inserted into the valve body 12 to reside within the gallery 18. The valve body 12 may be adapted to allow the downstream portion of the flow control element 26 to be advanced into the gallery until the flange 74 engages with a shoulder formed on the valve body 12. A valve body insert 122 may be placed over the upstream end of the flow control element 26 to secure the flow control element 26 within the gallery 18. Various seals and/or packing elements known in the art for mitigating the unwanted bleeding or leakage of fluid from the valve 10 may be employed as needed. In this regard, those of ordinary skill in the art that many of the components of the control valve 10 described above and/or shown in FIGS. 1 and 3 other than for the flow control element 26 and sleeve plug 34 are exemplary only, and that flow control element 26 and sleeve plug 34 may be integrated into valves of differing construction than that shown and described above.

In use, with the control valve 10 being in the closed position (see FIGS. 3 and 4), the distal rim 44 of the sleeve plug 34 is seated against the liner seating surface 70 of the outer liner 30. In this position, the sleeve plug 34 covers all of the inlet openings 66 formed on the outer liner 30, and thus fluid is prevented from flowing through the flow control element 26.

As the control valve 10, and in particular the sleeve plug 34, transitions from the closed position toward the open position, the distal rim 44 of the sleeve plug 34 is moved from the liner seating surface 70 to expose at least one inlet opening 66, while at least some of the remaining openings 66 are still covered by the sleeve plug 34. In this respect, with the sleeve plug 34 being in a partially-open position, fluid may enter the exposed inlet opening(s) 66 and flow into the corresponding feed slot(s) 96 associated with the exposed inlet opening(s) 66. The fluid continues through the feed slot(s) 96 and transitions into the corresponding connecting slot(s) 102 and continues through the corresponding tortuous resistance path(s) 100. As the fluid flows through the resistance path(s) 100, the pressure of the fluid is reduced. When the fluid reaches the discharge opening(s) 104, the fluid is discharged into the cage bore 84, and continues on to the outflow passage 16.

When the valve 10 is close to its fully open position, every inlet opening 66 is exposed, thereby allowing fluid to enter each of the feed slots 96 and corresponding resistance paths 100. However, the bypass openings 68 remain covered, thereby preventing fluid from passing through the bypass openings 68 and into the cage bore 84. Thus, when the valve 10 is almost in its fully open position, all fluid passing through the outflow passage 16 will have passed through the feed slots 96 and the corresponding resistance paths 100.

The movement of the control valve 10, and in particular the sleeve plug 34 thereof, to the fully open position exposes the bypass openings 68. The uncovering or exposure of the bypass openings 68 allows fluid flow through the aligned bypass openings 68, 110 and directly into the cage bore 84, effectively "bypassing" the feed slots 96, resistance paths 100 and intervening connecting slots 102. As will be recognized, fluid entering the cage bore 84 from the bypass openings 68, 110 is able to flow directly into the outflow passage 16.

According to one embodiment, the control valve 10 creates a pressure balance on opposed sides of the sleeve plug 34. In particular, the valve stem 24 includes a stem passageway 120 that on one end communicates with the gallery 18, and particularly, the cage bore 84, and on the other end communicates with the bore 22 formed in the bonnet 20. Thus, as pressurized fluid enters the cage bore 84, the fluid may fill the cage bore 84 and flow through the stem passageway 120 and into the bonnet bore 22 to balance the pressure on either side of the sleeve plug 34.

Referring now to FIGS. 8-13, there is depicted another embodiment of a control valve 210, which generally include a valve body 212, a bonnet 220, and a flow control element 226. The primary distinction between the first embodiment described above and shown in FIGS. 1-7, and the second embodiment described below and shown in FIGS. 8-13, relates to the flow control element 226, and thus, the following discussion will focus on the flow control element 226.

The flow control element 226 includes three primary components, namely, an inlet element 228, a resistance element 232, and an outer liner or sleeve 230. The inlet element 228 includes a first end portion 234 coupled to an actuating valve stem 236, with the first end portion 234 being received within a recess 238 formed within the valve stem 236. The first end portion 234 transitions into an inlet element seating surface 240, which is frusto-conical in shape, with a tapered diameter which decreases in a direction extending away from the first end portion 234. An inlet region 242 extends from the inlet element seating surface 240, with the inlet region 242 having a plurality of inlet openings 244 extending from an outer surface 246 of the inlet element 228 to an inner surface 248 of the inlet element 228, which along with a chamber end wall 250, defines an inner chamber 252. In an exemplary embodiment, and referring specifically to FIG. 11, the inlet region 242 includes five levels of openings, with openings 244a being on a first level, openings 244b being on a second level, openings 244c being on a third level, openings 244d being on a fourth level, and openings 244e being on a fifth level. The openings in the first, third and fifth levels are axially aligned with each other and slightly offset from the openings formed on the second and fourth levels, the openings on the second and fourth levels being axially aligned with each other.

The inlet element 228 further includes a stem 254 extending from the chamber end wall 250. A plurality of drainage openings 256 are in communication with the inner chamber 252 and extend from the chamber end wall 250 and through the stem 254 to the outer surface 246 of the inlet element 228. The drainage openings 256 have an angled configuration, wherein the draining openings 256 are neither perpendicular nor parallel to an inlet element axis 258. In the exemplary embodiment, the inlet element 228 includes three drainage openings 256, with each drainage opening 256 being considerably larger than the inlet openings 244. However, the size, number and arrangement of the drainage openings 256 may vary.

The resistance element 232 includes a first end portion 260 (e.g., an upstream end portion) and a second end portion 262 (e.g., a downstream end portion), wherein the first end portion 260 includes a resistance element seating surface 264 that is complimentary in shape to the inlet element seating surface 240 such that when the flow control element 226 is in the closed position, the inlet element seating surface 240 is seated against the resistance element seating surface 264. The resistance element 232 further includes an outer surface 266 and an opposing inner surface 268, with the inner surface 268 defining a resistance element bore 270 having a wide upstream region and a narrow downstream region. The outer surface 266 defines a resistance element shoulder 272 (see FIG. 9) adjacent the first end portion 260.

A plurality of resistance paths 274 are formed in the resistance element 232, with the resistance paths 274 extending into the resistance element 232 from the outer surface 266 thereof. The resistance paths 274 extend only partially into the resistance element 232, and thus, the resistance paths 274 are not in direct fluid communication with the resistance element bore 270. The resistance paths 274 are tortuous or serpentine in configuration, and thus comprise both axial and circumferential components. In particular, adjacent axial components are connected via an intervening circumferential component. The tortuous or serpentine configuration of the resistance paths 274 provides multiple stages of pressure reduction as fluid flows therethrough.

Each resistance path 274 is in fluid communication with a path inlet opening 276 on one end, and a path discharge opening 278 on the other end. The path inlet opening 276 is in communication with the upstream region of the resistance element bore 270, while the path discharge opening 278 is in communication with the downstream region of the resistance element bore 270. According to one embodiment, the path inlet openings 276 are formed at various axial locations on the resistance element 232. For instance, in the exemplary embodiment, the resistance element 232 includes path inlet openings 276a and 276b, which are axially offset from each other. In particular, opening 276a is spaced farther from the resistance element seating surface 264 than opening 276b. The purpose of the axial offset is to allow for a selective and incremental throttling of the resistance paths 274, as will be discussed in more detail below.

The exemplary path discharge openings 278 are angled downwardly, and thus are offset from an axis perpendicular to the resistance element axis 280. However, it is understood that the path discharge openings 278 may be perpendicular to the resistance element axis 280 without departing from the spirit and scope of the present invention. In the exemplary embodiment, a first group of discharge openings are formed at a first discharge opening level and a second group of discharge openings are formed at a second discharge opening level.

The depth of the resistance path 274 (e.g., the distance by which the resistance path extends into the resistance element 232) may increase from the path inlet opening 276 to the path discharge opening 278. The increase in resistance path depth allows for a greater reduction in pressure as the fluid flows therethrough. Although the exemplary embodiment includes resistance paths 274 with a variable depth, it is understood that in other embodiments, the resistance paths 274 may each have a substantially uniform depth along the length thereof.

The outer liner 230 includes a sleeve-like body that is cylindrical in shape and which is sized to fit over the outer surface 266 of the resistance element 232. In particular, the outer liner 230 includes an outer surface 282 and an inner surface 284 defining a liner bore sized to receive the resistance element 232. A lip 286 is formed on the outer liner 230, with the lip 286 being configured to engage with the resistance element shoulder 272 to secure the resistance element 232 within the outer liner 230. The external configuration of the outer liner 230 is comprised of a first region 288, a second region 290 and a third region 292, wherein the first region 288 is of a first diameter, the second region 290 is of a second diameter larger than the first diameter, and the third region 292 is of a third diameter less than the second diameter which results in the second region 290 defining a radially extending flange. The flange rests against a complimentary shoulder formed in the valve body 212 when the flow control element 226 is placed in the valve body 212.

An end cap 294 is secured to the third region 292 of the outer liner 230 and the second end portion 262 of the resistance element 232, with the end cap 294 having an end cap bore 296 which is complimentary in shape to the resistance element bore 270.

The resistance element 232, outer liner 230 and end cap 294 may be formed separately and joined when each is in a semi-soft or workable state (e.g., a "green" state), which allows the newly formed assembly (i.e., the combined resistance element 232, outer liner 230, and end cap 294) to meld together to form a unitary structure. In particular, the first end portion 260 of the resistance element 232 is inserted into the third region 292 of the outer liner 230, with the resistance element 232 being advanced into the liner 230 until the resistance element shoulder 272 rests against the liner lip 286. The resistance element 232 and outer liner 230 are preferably formed such that the respective end walls are substantially flush with each other when the resistance element 232 is completely inserted into the liner 230. When the resistance element 232 is completely inserted within the outer liner 230 and the end cap 294 is in place, the entire assembly may be heated which allows the components to fuse together and form a substantially rigid, uniform structure upon cooling of the assembly.

Once the resistance element 232, outer liner 230 and end cap 294 are joined, the inlet element 228 may be inserted into the fused assembly, with the stem 254 of the inlet element 228 being advanced through the resistance element bore 270 and received within the narrow downstream region of the bore 270.

In use, the flow control element 226 may be selectively transitioned between closed and open positions to allow for selectively throttling of the inlet element 228 relative to the resistance element 232 for controlling the number of inlet openings 244 and resistance paths 274 exposed to the fluid flow. When the inlet element 228 is in the closed position, the inlet element seating surface 240 is positioned against the resistance element seating surface 264, and all of the inlet openings 244 are recessed within the resistance element 232. Therefore, fluid is prevented from flowing through the flow control element 226.

Figure 9:
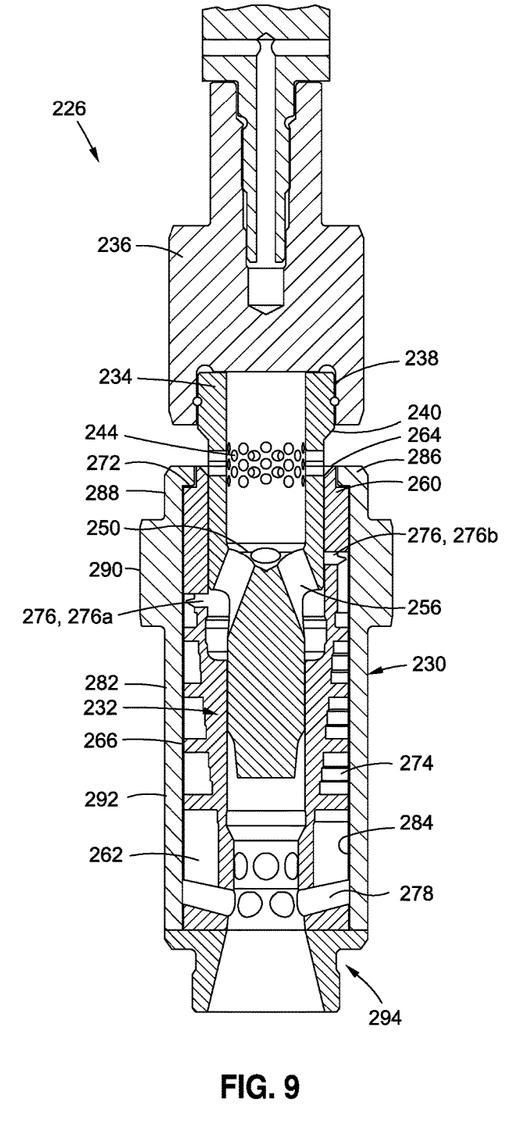
FIGS. 9 and 10 are cross-sectional views similar to FIG. 8, but depicting only the plug and flow control element of the valve, with the plug being in the open position.
Figure 10:
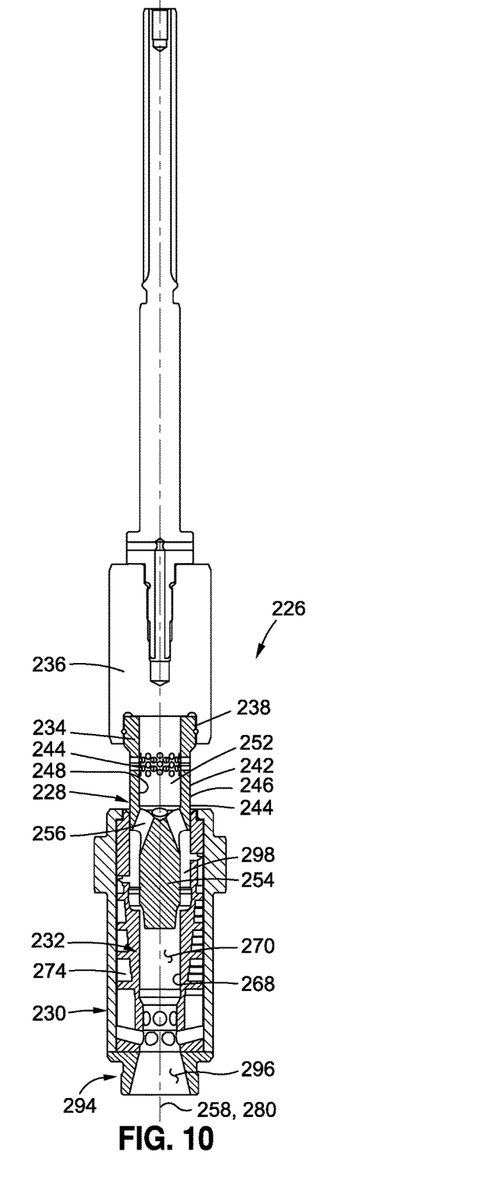
Figure 11:
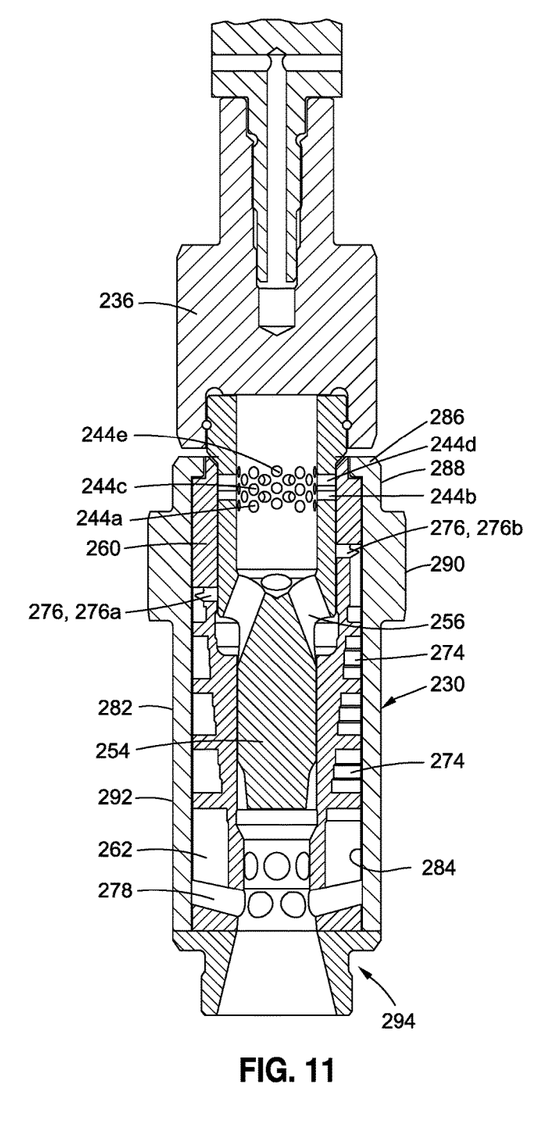
FIGS. 11 and 12 are cross-sectional views similar to FIG. 8, but depicting only the plug and flow control element of the valve, with the plug being in the closed position.
Figure 12:
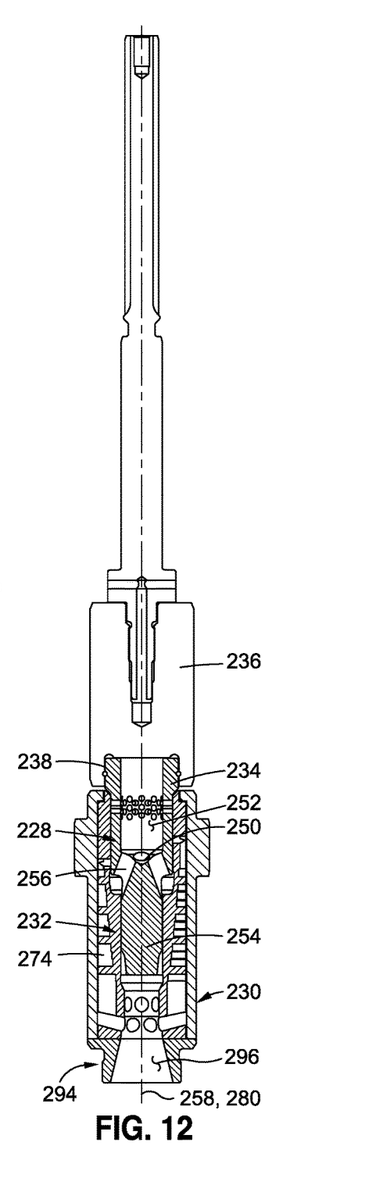
Figure 13:
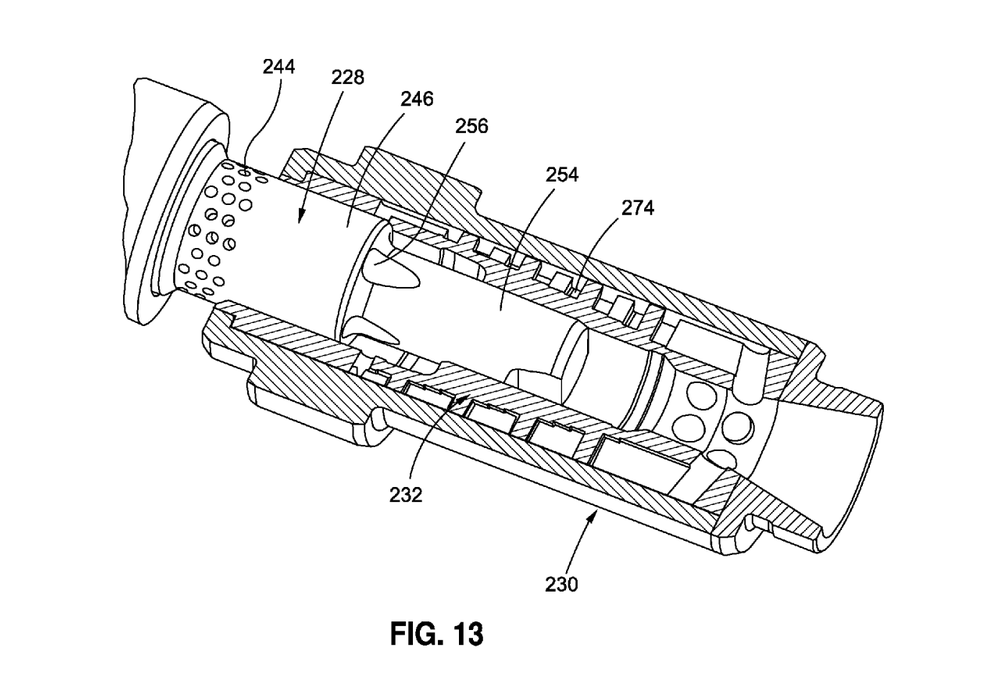
FIG. 13 is a perspective, cross-sectional view of the flow control element shown in FIGS. 8-12, further depicting the plug in its open position.

As the valve stem 236 is moved away from the resistance element 232 and outer liner 230, the inlet element 228 coupled to the valve stem 236 begins to move out of the resistance element 232. In the exemplary embodiment, the fifth level of inlet openings 244e are the first openings 244 which will be exposed to the fluid flow, while the first level of inlet openings 244a will be the last openings 244 exposed to the fluid flow. If the inlet element 228 is positioned relative to the resistance element 232 such that some inlet openings are exposed to the fluid, while other inlet openings remain covered by the resistance element, the inlet element 228 is considered to be in a partially open position. FIG. 9 shows the inlet element 228 in a partially open position. As fluid enters the exposed inlet openings 244, the fluid passes into the inner chamber 252 of the inlet element 228. The fluid drains out of the inner chamber 252 view the drainage openings 256 and into a throttling chamber 298 that is in fluid communication with the drainage openings 256 and is collectively defined by the inlet element 228 and the resistance element 232. In particular, the throttling chamber 298 is effectively that portion of the wide upstream region of the resistance element bore 270 that is not occupied by the inlet element 228. Accordingly, the size of the throttling chamber 298 varies as the inlet element 228 moves between the closed and open positions. In particular, the size of the throttling chamber 298 increases as the inlet element 228 moves from the closed position toward the open position. Conversely, the size of the throttling chamber 298 decreases as the inlet element 228 moves from the open position toward the closed position. Movement of the inlet element 228 relative to the resistance element 232 also incrementally exposes the path inlet openings 276 to the fluid flow. In the partially open position, at least one path inlet opening 276 is exposed to the fluid flow, while at least one path inlet opening 276 remains covered by the inlet element 228, and is thus isolated from the fluid flow. The exposed path inlet opening 276 receives the fluid from the throttling chamber 298 and communicates the fluid to the corresponding resistance path 274. The fluid flows through the resistance path 274 and passes through the path discharge opening 278 and into the resistance element bore 270. From the bore 270, the fluid flows through the bore 296 of the end cap 294 and into the outflow passage 16.

When the inlet element 228 is in the fully open position, the inlet element 228 has been moved out of the resistance element 232 by a distance which exposes all of the inlet openings 244 to the fluid flow and all of the path inlet openings 276 to the throttling chamber 298. In this respect, when the inlet element 228 is in the fully open position, fluid may flow through all of the inlet openings 244 and through all of the resistance paths 274.

As the inlet element 228 moves from the open position toward the closed position, the inlet element 228 moves back into the resistance element 232, with the inlet openings 244 becoming incrementally covered by the resistance element 232 and the path inlet openings 276 becoming incrementally covered by the inlet element 228. When the inlet element 228 reaches the closed position, all of the inlet openings 244 are positioned within and covered by the resistance element 232 and the path inlet openings 276 are covered by the inlet element 228 so as to prevent fluid from flowing through the flow control element 226.

Though not shown, another embodiment of the present disclosure is contemplated wherein the control valve is outfitted with a flow control element similar to the flow control element 26, but differing from the standpoint that both the cage 28 and outer liner 30 will have more uniformly cylindrical configurations, as opposed to be provided with the aforementioned various regions or sections of differing outer diameter and separated by various shoulders.

This disclosure provides exemplary embodiments of the present disclosure. The scope of the present disclosure is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:
1. A multi-stage control valve, comprising:
a valve body;
a flow control element disposed within the valve body and including:
a cage having an outer surface and an inner surface at least partially defining a bore which extends therethrough along an axis; and
a plurality of flow paths, each of the flow paths having opposed ends, being at least partially formed in the outer surface to a prescribed length therein and extending along the axis of the bore, each of the flow paths further defining a single, dedicated feed opening which is proximate one of the opposed ends and a single, dedicated outlet opening which is proximate the remaining one of the opposed ends, each flow path being in communication with the bore only at the single, dedicated outlet opening; and a sleeve plug reciprocally movable along the axis in a manner which allows for selective variations in a portion of the cage, and a number of feed openings of the flow paths, covered thereby.

2. The valve of claim 1 wherein the feed openings of the flow paths are arranged in a helical pattern relative to the axis of the bore.

3. The valve of claim 1 wherein each of the flow paths comprises:
a feed slot which communicates with the inlet opening and has a non-tortuous configuration; and
a resistance path which communicates with the feed slot and the outlet opening, and has a tortuous configuration.

4. The valve of claim 3 wherein the cage has an annular, cylindrical configuration defining an upper portion which includes the feed slots formed therein and is of a first diameter, and a lower portion which includes the resistance paths formed therein and is of a second diameter exceeding the first diameter.

5. The valve of claim 4 wherein:
the upper and lower portions of the cage are separated by an annual shoulder; and
each of the flow paths further comprises a connecting slot which is formed in the shoulder and facilitates the fluid communication between one of the feed slots and a corresponding one of the resistance paths.

6. The valve of claim 5 wherein the resistance path of each of the flow paths is of a gradually increasing depth as it extends from a corresponding one of the connecting slots to a corresponding one of the outlet openings.

7. The valve of claim 6 wherein the resistance path of each of the flow paths includes both axial and circumferential components, with adjacent ones of the axial components being connected via an intervening one of the circumferential components.

8. The valve of claim 3 wherein the resistance path of each of the flow paths is of a gradually increasing depth as it extends from the feed slot to the outlet opening.

9. The valve of claim 3 wherein the resistance path of each of the flow paths includes both axial and circumferential components, with adjacent ones of the axial components being connected via an intervening one of the circumferential components.

10. The valve of claim 3 wherein the flow control element further comprises at least one bypass opening which is selectively covered by the sleeve plug and, when not covered by the sleeve plug, is configured to allow fluid to flow into the bore bypassing each of the flow paths.

11. The valve of claim 3 wherein the flow control element further comprises an outer liner which at least partially covers the cage, and defines the feed openings which fluidly communicate with respective ones of the feed slots.

12. The valve of claim 11 wherein:
the cage further comprises at least one cage bypass opening extending between the outer and inner surfaces thereof, and fluidly communicating with the bore; and
the liner further comprises at least one liner bypass opening extending therethrough, and fluidly communicating with the cage bypass opening;
the cage and liner bypass openings collectively defining at least one bypass opening which is selectively covered by the sleeve plug and, when not covered by the sleeve plug, is configured to allow fluid to flow into the bore bypassing each of the flow paths.

13. The valve of claim 1 wherein each of the flow paths extends in parallel relation to the axis of the bore.

14. A multi-stage control valve, comprising:

a valve body; and a flow control element disposed within the valve body and including:

an inlet element defining an inner chamber and a plurality of inlet openings which each fluidly communicate with the inner chamber; and a resistance element having an outer surface and an inner surface at least partially defining a bore which extends therethrough along an axis, the resistance element defining a plurality of resistance paths which each have opposed ends, are each at least partially formed in the outer surface to a prescribed length therein and extend along the axis of the bore, each of the resistance paths being in fluid communication with a single, dedicated path inlet opening which is proximate one of the opposed ends and a single, dedicated path discharge opening which is proximate the remaining one of the opposed ends and fluidly communicates with the bore, each resistance path being in communication with the bore only at the single, dedicated path discharge opening;

the inlet element being reciprocally movable along the axis in a manner which allows for selective variations in a number of the inlet openings covered by the resistance element and selective variations in a number of the path inlet openings covered by the inlet element.

15. The valve of claim 14 wherein the inlet openings of the inlet element are arranged in at least five levels.

16. The valve of claim 14 wherein the inlet element further includes an elongate stem which is at least partially advanced into the bore and includes at least one drainage opening formed therein which extends between and fluidly communicates with both the inner chamber and the bore.

17. The valve of claim 16 wherein each of the resistance paths includes both axial and circumferential components, with adjacent ones of the axial components being connected via an intervening one of the circumferential components.

18. The valve of claim 14 wherein each of the resistance paths has a tortuous configuration as it extends between corresponding ones of the path inlet and discharge openings.

19. The valve of claim 14 wherein each of the resistance paths is of a gradually increasing depth as it extends from a corresponding one of the path inlet openings to a corresponding one of the path discharge openings.

20. The valve of claim 14 wherein at least some of the path discharge openings each define an axis which extends in non-perpendicular relation to the axis of the bore.

21. The valve of claim 14 wherein the path inlet openings are offset from each other along the axis of the bore.

22. The valve of claim 14 wherein each of the resistance paths extends in parallel relation to the axis of the bore.

* * * * *